– – – – –

United States Patent [19]

Parkes

[11] Patent Number: 4,525,370

[45] Date of Patent: Jun. 25, 1985

[54] WATER TYPE BLANCHER

[75] Inventor: Richard B. Parkes, Wyncote, Pa.

[73] Assignee: National Drying Machinery Co., Philadelphia, Pa.

[21] Appl. No.: 620,723

[22] Filed: Jun. 14, 1984

[51] Int. Cl.³ .................... A23B 7/06; A23N 12/00
[52] U.S. Cl. ...................... 426/508; 99/483; 99/536; 426/509
[58] Field of Search ............ 426/508, 509, 520, 615; 99/483, 516, 536, 443 C

[56] References Cited

U.S. PATENT DOCUMENTS 2,556,385 6/1951 Allan ........................ 99/536
2,692,200 10/1954 Olson ........................ 426/508

Primary Examiner—George Yeung
Attorney, Agent, or Firm—Steele, Gould & Fried

[57] ABSTRACT

A deluge water type vegetable blancher is disclosed which comprises an elongated tank, a conveyor above the tank to carry vegetables longitudinally of the tank, a flood/deluge system adapted to water blanch the vegetables upon the conveyor, drain lines in the tank to discharge the blanching water, a filter receiving the discharged water from the drain lines to continuously filter and recirculate the blanching water and one or more pumps including water heaters to supply hot water at substantially constant temperature throughout the entire flood/deluge system.

18 Claims, 3 Drawing Figures

WATER TYPE BLANCHER

FIELD OF THE INVENTION

The present invention relates generally to blanchers, and more particularly, is directed to a constant wash system suitable to water blanch vegetables without total immersion.

BACKGROUND OF THE INVENTION

In the processing of raw vegetables, for example, potatoes, it is the common practice to blanch the raw vegetables prior to the cooking and freezing operations. Blanching is usually required in the vegetable food processing industry to inactivate enzymes, to expel air and other gases which may be present in the food product, to remove sugar which may build up during storage by converting the sugar into starch and to remove harsh flavors and certain odors which may be present prior to cooking and freezing operations. Rapid cooling is usually required immediately after blanching in order to avoid overcooking and to prevent the growth of microorganisms which might otherwise occur during a slow cooling process.

Most prior art commercial vegetable processing blanchers have been designed of the immersion type wherein an elongated tank was filled with extremely hot water and the vegetables were carried through the immersion bath by employing a known transporting means, such as a conveyor or an auger. Other blanchers have employed steam nozzles in conjunction with the vegetable transporting means in order to effect rapid blanching by utilizing steam sprays above and/or below the conveyor.

The prior art immersion type blanchers have disadvantages inherent with any tank type design in that the bath water could not be satisfactorily circulated throughout the tank rapidly enough to maintain substantially even temperatures from front to back. The introduction of the vegetables to be blanched at one end of the tank had a quenching effect at the inlet end whereby the bath water temperature could not be maintained at the inlet end substantially the same as in the downstream areas of the bath. During blanching operations, the bath tended to become stagnated wherein the water could not be continuously filtered. Additionally, the natural sugars in the vegetables tend to form starches. The immersion type blanchers were incapable of effectively removing the starch from the surface of the vegetables due to the quiescent nature of the bath water. All of this has generally resulted in a non-uniform final product with inherent, serious quality control problems.

SUMMARY OF THE INVENTION

The present invention relates generally to vegetable blanchers, and more particularly, is directed to a deluge type blancher including a blanching conveyor and deluge spray means above the conveyor capable of flooding the conveyor and providing a substantially constant temperature hot water blanch throughout the length of the apparatus.

The water blancher of the present invention includes an elongated stainless steel tank which is supported at a desired height by a substantial frame of suitable strength for the service. A conveyor receives raw vegetables from a feed conveyor in a usual manner and carries the vegetables over the tank and through the apparatus for blanching purposes. The conveyor speed can be varied as necessary to assure optimum blanching conditions depending upon the type of vegetable being processed, the time of year, the sugar build-up content in the vegetables, the temperature of the blanching water, etc.

A novel hydraulic deluge system has been designed which includes a plurality of deluge spray heads which are positioned above the conveyor to direct a constant wash of heated water upon the vegetables as they are carried through the apparatus by the conveyor. In a preferred embodiment, the required hot water for water blanching is supplied by a plurality of pumps which are connected to discharge the hot water through more than one zone. The hot water system includes one or more supply headers and a plurality of transversely positioned, longitudinally spaced branches with a sufficient nozzles connected in the branches to assure overall flooding of the conveyor with hot water as may be necessary to effect uniform blanching throughout.

An elongated tank is provided below the blanching conveyor to receive the effluent from the deluge branch pipes after the hot water has contacted the vegetables and has dropped by gravity through the conveyor. It is noteworthy that the water type blanching system of the present invention functions to wash substantially all of the starch which may result from the blanching off of the product as it is conveyed through the apparatus. The continuous removal the starches during blanching considerably improves the quality of the blanched product, an effect that could not be achieved in the immersion type blanchers.

A filter system is provided to receive the water discharge from the tank in a manner to continuously filter the water as it is recirculated. Starches and other materials washed from the vegetables during the deluge blanch operation are removed in the filter in known manner and the filtered water is recycled to one or more deluge pumps.

The pump discharge is equipped with a steam or other known type of water heater to continuously and accurately heat the water to a blanching temperature, for example, two hundred degrees F., prior to delivery to the deluge water headers. Preferably, more than one feed pump and more than one water heater is provided to supply heated water to a plurality of deluge zones, whereby substantially uniform blanching water temperature can be provided throughout the entire length of the apparatus.

In a separate embodiment of the invention, the tank and the blanching conveyor could be arranged for immersion type blanching or for a combination of immersion, flood/deluge and/or steam blanching whereby, with but minor equipment alterations and adjustments, the same apparatus could be utilized for immersion type blanching, flood/deluge type blanching or steam type blanching, or perhaps combinations thereof, depending upon the product involved and the type of blanching that can most advantageously be performed to produce optimum end results.

It is therefore an object of the present invention to provide an improved vegetable blancher of the type set forth.

It is another object of the present invention to provide a novel flood/deluge water type vegetable blancher which comprises an elongated tank, a conveyor above the tank to carry vegetables longitudinally of the tank, a flood/deluge system adapted to water blanch the vegetables upon the conveyor, drain means in the tank to discharge the blanching water, filter means receiving the discharged water from the drain means to continuously filter and recirculate the blanching water and pumping means including water heating means to supply water at substantially constant temperature throughout the flood/deluge system.

It is another object of the present invention to provide a novel water type blancher including an elongated conveyor to longitudinally transport the vegetables to be blanched, a series of longitudinally spaced, a transversely positioned deluge heads carried above the conveyor to direct a flood of hot water upon the vegetables on the conveyor, zoned water heating means to maintain the temperature of the deluge water substantially constant throughout the length of the apparatus and filter means receiving the effluent from the deluge heads after water blanching the vegetables to filter the water for recirculation purposes.

It is another object of the invention to provide a novel water type vegetable blancher including a system of pipes spaced above a conveyor, the pipes being provided with sufficient spray nozzles to provide a constant flood/deluge wash of hot water upon vegetables carried by the conveyor wherein the pipes are arranged transversely across the conveyor and are equally spaced along the entire length of the conveyor to supply a substantially uniform flow of hot water upon the vegetables throughout the length of the apparatus.

It is another object of the present invention to provide a novel type vegetable blancher including conveyor means to carry vegetables to be blanched longitudinally through the apparatus, deluge head means above the conveyor means to direct a constant wash of hot water upon the vegetables, tank means below the conveyor to receive the water effluent from the deluge head means, filter means receiving the water from the tank to constantly filter and recirculate the water and pump means including water heating means to supply a constant volume of water at substantially constant temperature throughout the apparatus.

It is another object of the present invention to provide a novel water type vegetable blancher that is uniform in operation, rugged in construction and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

DESCRIPTION OF THE PREFERRED EMBODIMENT OF THE INVENTION

Figure 1:
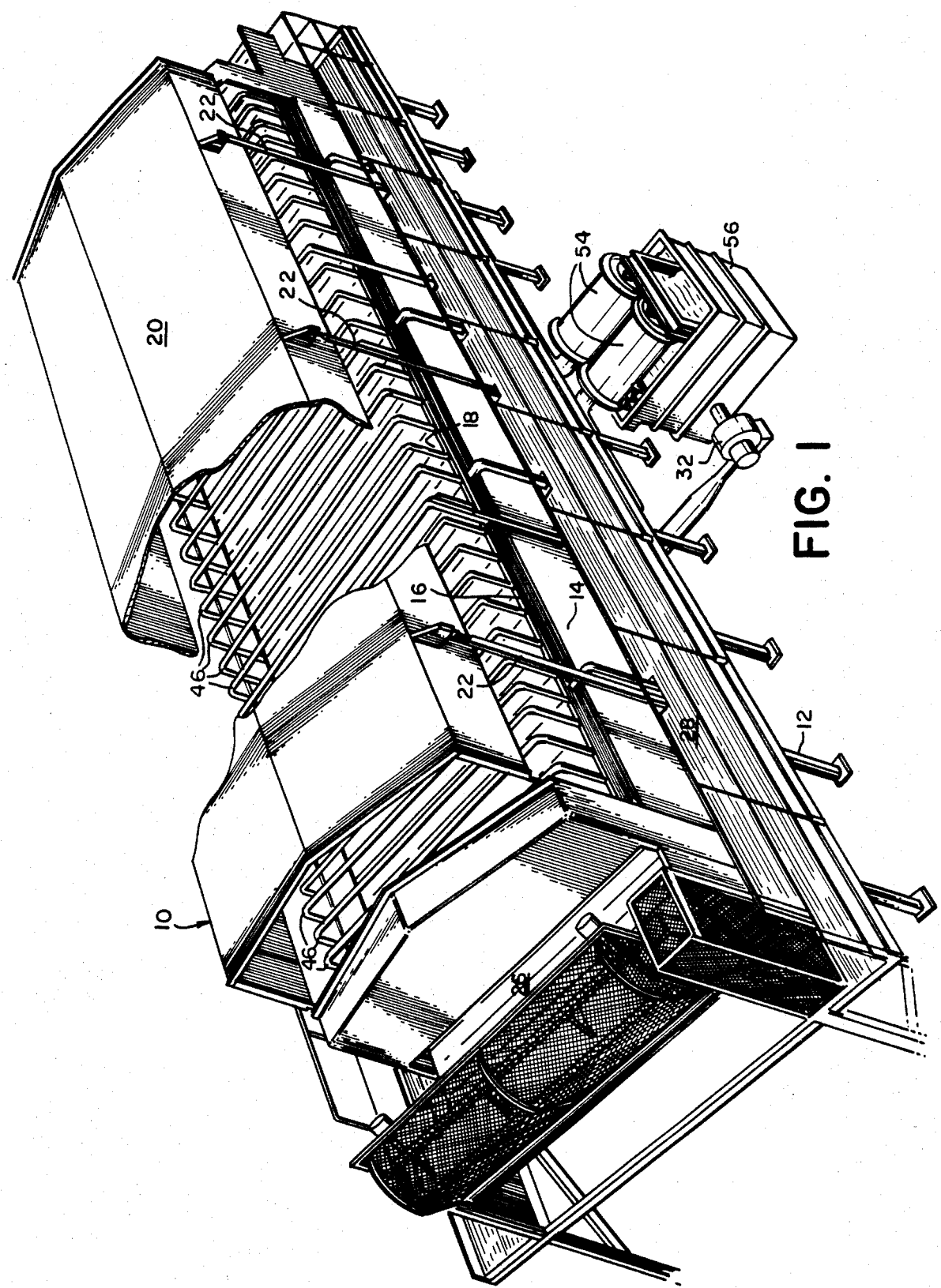
FIG. 1 is a perspective view of a water type vegetable blancher constructed in accordance with the teachings of the present invention and partially broken away to expose interior construction details.

Although specific terms are used in the following description for the sake of clarity, these terms are intended to refer only to the particular structure of the invention selected for illustration in the drawings, and are not intended to define or limit the scope of the invention.

Referring now to the drawings, there is illustrated in FIG. 1 a flood/deluge type vegetable blancher 10 suitable to direct large quantities of hot water upon the vegetables carried upon a conveyor. The deluge system design functions to flood the conveyor with water and thereby renders the transported vegetables slightly buoyant for optimum overall blanching. Additionally, the quantities of water and the action of the deluge agitation function as a constant wash to remove starches as they are formed from natural sugar during the blanching procedures. Depending upon the nature and the size of the vegetable particles being processed, the temperature of the water may be varied as required for optimum results, for example, from approximately one hundred and seventy degrees F. to almost boiling temperature and the speed of the conveyor can be adjusted to provide a blanching time of from as little as one and one-half minutes to approximately twelve minutes or more.

A sturdy structural stainless steel frame 12 is designed in known manner for food processing use and is formed of adequate strength to properly support an elongated tank 14. The tank and the supporting frame are preferably fabricated of stainless steel construction to comply with food processing industry standards. In the preferred embodiment, the tank comprises a bottom 18 and enclosing sidewalls 16 of watertight design. If desired, with certain alterations to operating conditions and controls, the blancher of the present invention could be converted for the more usual, immersion blanching type of operation by employing the tank to retain a blanching water bath therewithin.

To enhance the operating characteristics of the blancher 10, the entire tank 14 preferably is protected by a layer 64 of insulation about the tank sides and bottom 16, 18 to maintain the blanching temperature substantially constant in the vegetables are being processed. An insulated stainless steel roof 20 of design well known to those skilled in the art is supported above the tank 14 by a plurality of posts or other supports 22. In a preferred embodiment, a plurality of operators 66 can be provided to facilitate elevating the roof 20 relative to the tank 14 for cleaning purposes. As shown, a peripherally positioned platform 28 is supported by the frame 12 about the tank 14 to permit easy access to the operating parts and to facilitate operation of the blancher.

Figure 2:
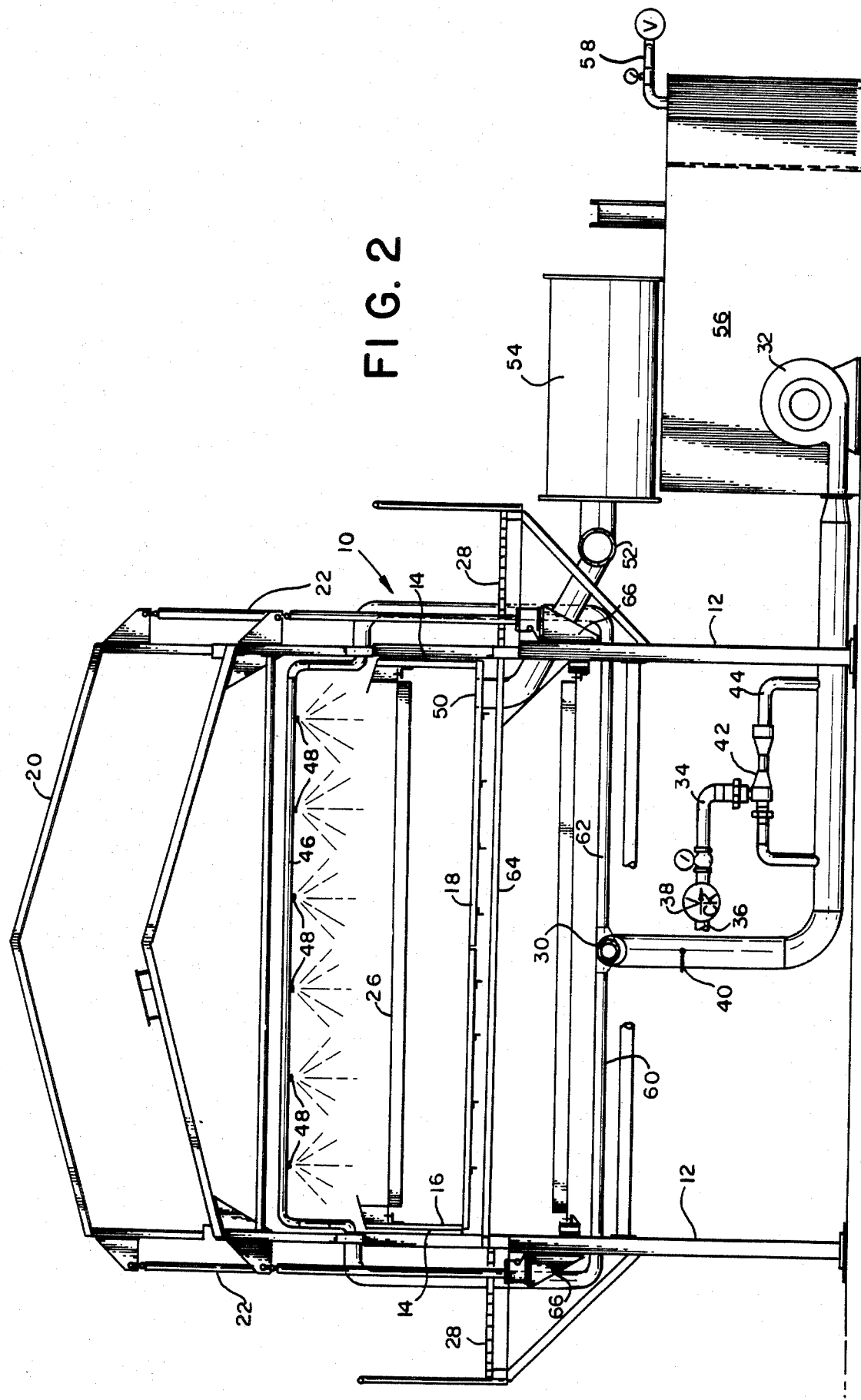
FIG. 2 is an end elevational view of the water type vegetable blancher of FIG. 1.
Figure 3:
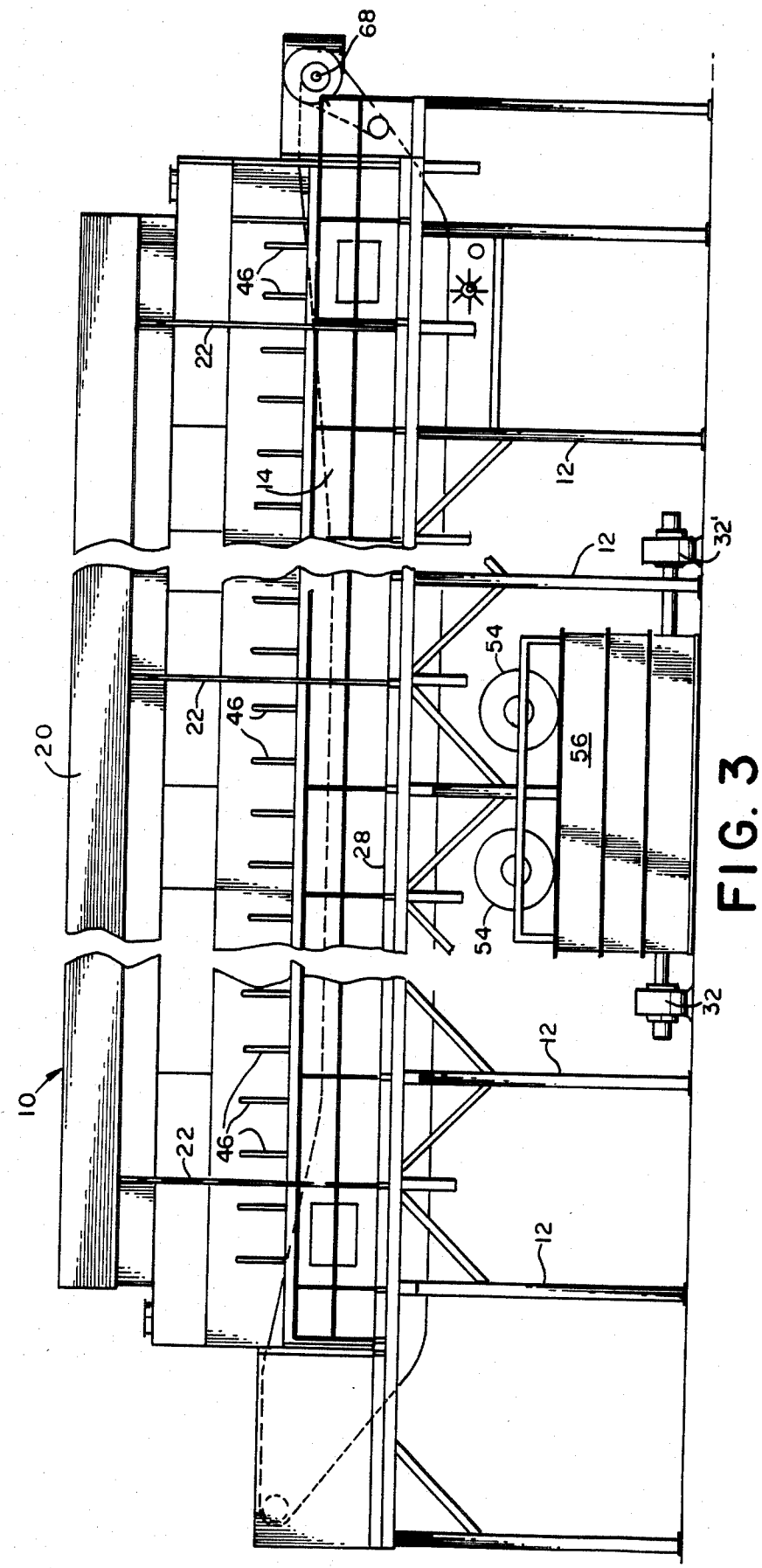
FIG. 3 is a side elevational view of the blancher of FIG. 1.

Still referring to FIG. 1, and considering also FIGS. 2 and 3, one or more large capacity pumps 32, 32' respectively draw their suctions from a filtered water recirculating tank 56 and discharge large quantities of water to a feed water header 30 for water blanching the vegetables (not shown) upon the blanching conveyor 26. In the illustrated embodiment, a water heating system 34 is provided at each pump 32, 32' to heat and control the water temperature as the water is pumped to the feed water header 30. In one water heating system design, a steam supply line 36 is controlled by a variable steam control valve 38 to supply steam under pressure to a water heating loop 44. In the illustrated embodiment, a thermocouple 40 or other temperature responsive device is positioned in the pump discharge line downstream of the steam connection to control the operation of the steam control valve 38. As shown, a venturi 42 may be employed to thoroughly and speedily mix the water and steam which is inherent in the operation of the heated water circulation in the loop 44.

A plurality of transversely oriented, longitudinally spaced pipes 46 are positioned above the tank 14 and each pipe 46 is provided with a plurality of transversely spaced, downwardly directed deluge heads 48. The spacing of the pipes 46 and the deluge heads 48 and the capacity of the pumps 32, 32' has been carefully designed to insure that an adequate supply of hot water is directed over the entire surface of the conveyor 26 to effect water blanching of the vegetables (not shown) as they are being transported. The water supply should be adequate to flood the conveyor with water and to provide a continuous wash which is utilized both for water blanching and to effect starch removal.

As can be seen best in FIGS. 2 and 3, the heated water discharge from each pump 32, 32' is divided into left and right supply branches 60, 62 and the heated water supply is subdivided into two or more zones, each of which is equipped with its own filter 54, 54' and recirculated water tank 56. In this manner, a substantially constant water temperature can be assured at each deluge head 48 throughout the length of the system to thereby provide improved quality control and an improved end product.

As illustrated, the floor 18 of the tank 14 is provided with a plurality of laterally positioned, longitudinally spaced drains 50 to lead the water delivered by the deluge heads 48 away from the tank following the water blanching and vegetable washing operations. The drains lead the water to one or more drain headers 52 and thence to a water filter 54, 54'. A reel type strainer has been successfully employed as a filter in conjunction with a tank 56 to remove solids and starches in known manner prior to recirculation back to the deluge heads tank 48. It will be appreciated that other known types of filtering apparatus of adequate capacity for the service might also be chosen if desired. Each pump 32, 32' draws its suction from a filtered water tank 56 to continuously recirculate the heated, filtered water back to the deluge heads 48. Make up water as may be required in the system can be supplied in known manner through a valved water supply line 58.

In operation, the speed of the conveyor motor 68 can be adjusted in a known manner to properly time the blanching conveyor travel to optimumly expose the vegetables (not shown) being carried upon the conveyor 26 to the heated water for water blanching purposes. A transversely oriented feed conveyor may be employed in a usual manner to automatically load the vegetables upon the blanching conveyor 26. If desired, means may be built into the feed conveyor to evenly distribute the vegetables across the blanching conveyor 26 to assure uniform blanching treatment. Depending upon such variables as the type of vegetable being processed, the size of the vegetable and the nature of the pre-blanched processing, the controls 40 for the steam control valves 38 can be set to maintain the water supply delivered to the plurality of deluge heads 48 at the preselected desired temperature to effect optimum water blanching by a flood/deluge type system.

Preferably, the hot water is delivered in divided zones to the deluge heads 48 by employing a plurality of steam control valves 38, feed headers 30, supply branches 60, 62 as may be necessary to form a plurality of similiar hot water supply facilities. In this manner, the water supply temperature conditions can be maintained substantially constant throughout the length of the blancher 10 to thus provide an improved product that is water blanched at constant temperature throughout the entire duration of the blanching operation. Sufficient quantities of blanching water at the proper temperature for blanching is provided by the plurality of water heating systems or zones to effectively flood the entire conveyor surface with blanching water during the blanching operation. The quantities of hot water and the agitation action produced by the deluge heads effectively continuously wash starch from the vegetable surfaces during the water blanching operations.

In an alternative construction, a plurality of steam nozzles (not shown) together with accessory main and branch lines could be provided below the blanching conveyor 26 to effect steam blanching in known manner if desired. It is contemplated that the water deluge and steam blanch systems could be divided into various zones and that adequate controls could be provided in known manner to program water blanching in selected portions of the blancher, steam blanching in other portions of the blancher, or perhaps combinations of water blanching and steam blanching as may be desired. Additionally, as hereinbefore set forth, the tank 14 and conveyor 26 could be altered as necessary for immersion type operation without major construction changes, if desired.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed:

1. A water type vegetable blancher comprising
a frame;
an elongated tank supported upon the frame, the tank comprising a bottom and sidewalls extending upwardly from the bottom;
conveyor means operatively carried above the tank bottom and adapted to transport the vegetables longitudinally of the tank;
deluge means above the conveyor means to hot water blanch the vegetables,
the deluge means comprising a header and a plurality of spaced branches in fluid communication with the header, and deluge heads connected to the branches, the deluge heads being adapted to flood the vegetables with hot water as they are transported by the conveyor means, the hot water falling into the tank through the conveyor means after blanching;
drain means in the bottom of the tank to remove the blanching water; and
water feed means to supply water under pressure to the deluge heads,
the water feed means comprising a pump having its discharge connected to the header and means to heat the water sufficiently to effect hot water blanching of the vegetables.

2. The blancher of claim 1 wherein the branches comprise a plurality of transversely oriented, longitudinally spaced pipes.

3. The blancher of claim 2 wherein the deluge means is divided into at least two zones, each zone receiving its water supply independently of every other zone.

4. The blancher of claim 1 and water recirculation means connected to the drain means, the water recirculation means including a filter and a tank.

5. The blancher of claim 4 wherein the filter comprises a rotatable reel strainer.

6. The blancher of claim 1 wherein the means to heat the water comprises a steam connection to the pump discharge, the steam connection having sufficient capacity to heat the water at the deluge heads to a temperature slightly less than boiling.

7. The blancher of claim 1 wherein the deluge means comprises temperature control means to maintain substantially constant water temperature at all of the deluge heads.

8. The blancher of claim 7 wherein the temperature control means comprises dividing the deluge heads into a plurality of zones and a hot water supply pump having its discharge connected to the individually feed a quantity of hot water simultaneously to each zone to maintain substantially constant water temperature at all of the deluge heads.

9. The blancher of claim 8 wherein the temperature control means comprises a heating loop at each pump discharge for water heating purposes, each heating loop comprising a steam connection and a venturi to effectively mix the steam with the water discharged by the pump.

10. The method of blanching raw vegetables having enzymes comprising loading the vegetables upon a conveyor and transporting the vegetables through a blanching apparatus for a predetermined period of time;

heating a quantity of water to a preselected temperature for vegetable blanching purposes;

pumping the heated water to a plurality of spaced pipes located above the conveyor;

discharging the heated water from the pipes and flooding the vegetables upon the conveyor with quantities of heated water for a preselected period of time; and water blanching the vegetables upon the conveyor to inactivate the enzymes.

11. The method of claim 10 wherein the discharging comprises connecting a plurality of spaced deluge nozzles in the pipes and discharging the heated water through the deluge nozzles.

12. The method of claim 11 wherein the discharging comprises spacing the nozzles substantially equidistantly along the spaced pipes.

13. The method of claim 12 wherein the discharging comprises spacing the pipes equidistantly and over the entire conveyor.

14. The method of claim 11 and recirculating the discharged water.

15. The method of claim 14 wherein the recirculating comprises collecting the discharged water in an elongated tank, draining the water from the tank and filtering the drained water.

16. The method of claim 15 wherein the heating comprises dividing the water into a plurality of zones and independently heating the water in each zone.

17. The method of claim 10 wherein the discharging comprises flooding the vegetables upon the conveyor by utilizing sufficient quantities of hot water.

18. The method of claim 10 including the step of changing the predetermined period of time by varying the speed of conveyor travel.

* * * * *